May 17, 1949.  P. A. BUCKY ET AL  2,470,469
SEQUENCE INDICATION APPARATUS
Filed Dec. 8, 1945  3 Sheets-Sheet 1
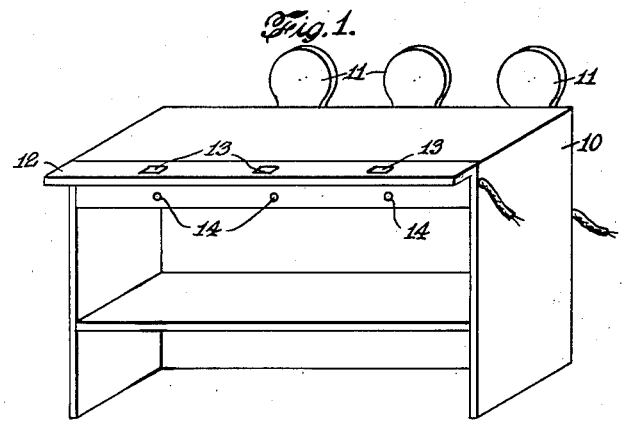
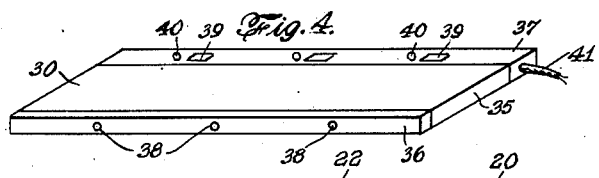
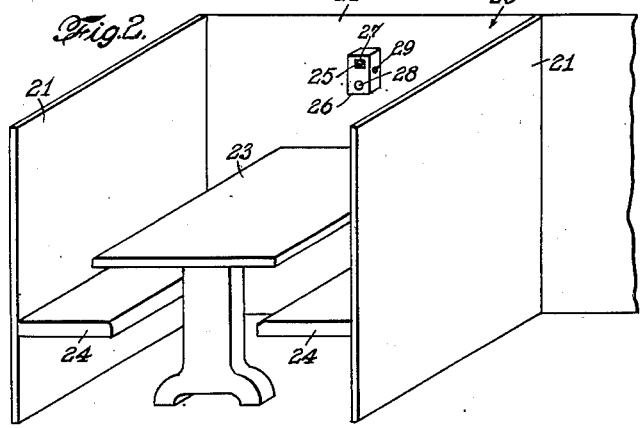
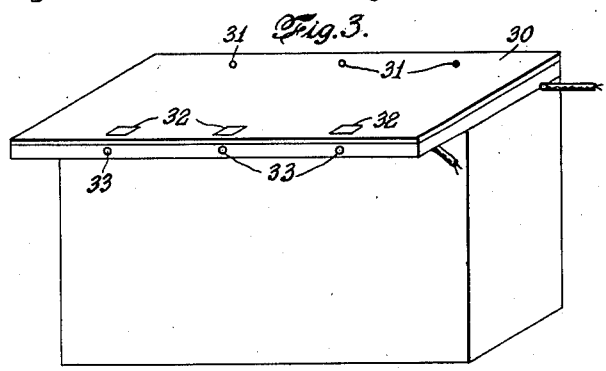
INVENTORS
PETER A. BUCKY
AND PAUL SARASON
BY
ATTORNEY May 17, 1949. P. A. BUCKY ET AL 2,470,469
SEQUENCE INDICATION APPARATUS
Filed Dec. 8, 1945 3 Sheets-Sheet 2

INVENTORS
PETER A. BUCKY.
AND PAUL SARASON
BY
ATTORNEY.

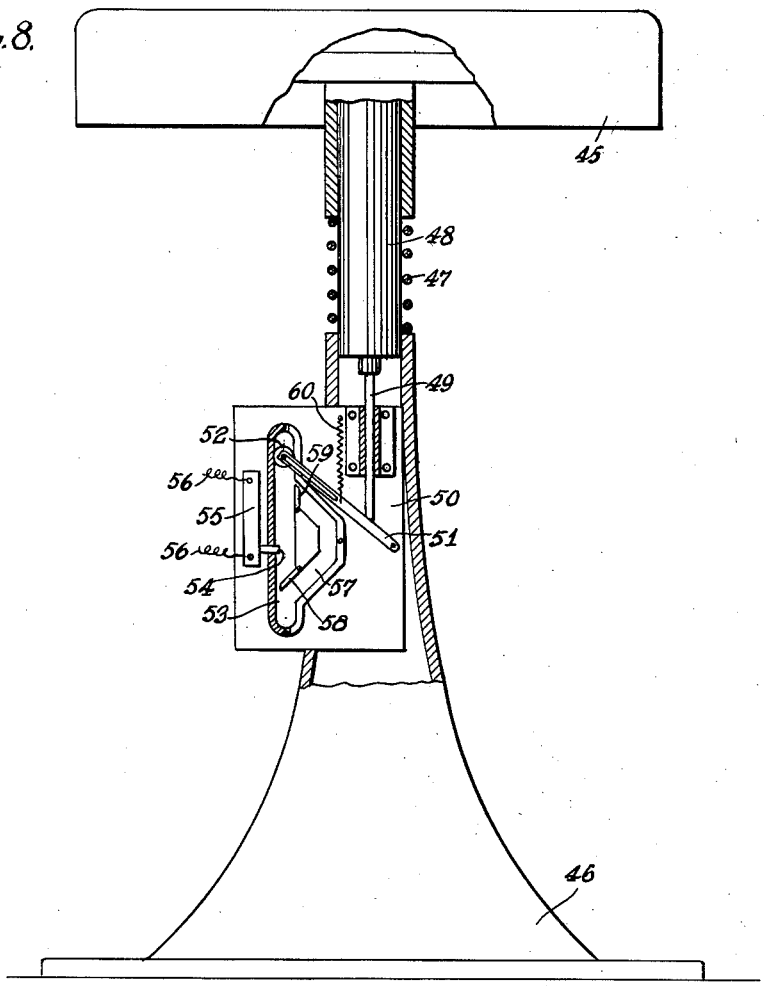
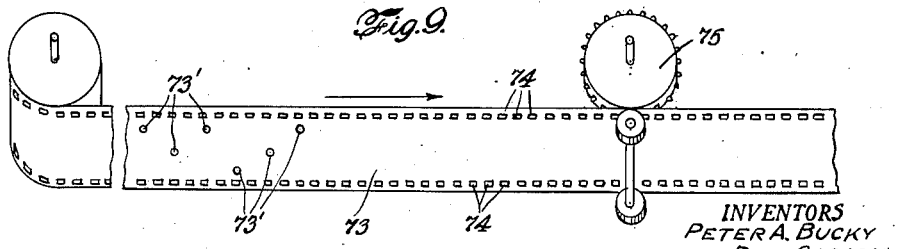

Patented May 17, 1949

2,470,469

UNITED STATES PATENT OFFICE 2,470,469

SEQUENCE INDICATION APPARATUS

Peter A. Bucky, Flushing, and Paul Sarason, New York, N. Y., assignors, by direct and mesne assignments, to Tell-a-Turn Corporation, New York, N. Y., a corporation of New York Application December 8, 1945, Serial No. 633,652

1 Claim. (Cl. 177—353)

The invention relates to sequence indication apparatus, operative more especially with reference to the order of serving purchasers of foods, drinks or commodities generally; also for indicating operational sequences, etc.

It has for an object to provide signal means whereby, in the case of service, a visual indication will be given to designate the party next to be served, such signal being effected automatically by the proximity of the purchaser to the point of sale or service.

A further object of the invention is to so arrange the indication that it will be visible both to the customer and the one responsible for the service.

A still further object of the invention is to provide means whereby, after service has been rendered, the particular signal may no longer be displayed and a signal corresponding to the service next in order will then be automatically displayed.

In carrying out the invention, provision is made for closing individually one or more of a plurality of electrical circuits, for example, automatically by the seating of a customer or, under the control of the customer, as in the provision of a suitable switch or button which when actuated will momentarily effect the circuit closing. Upon the closing of such circuit, a suitable opaque tape will be perforated and then immediately advanced so as to displace subsequent perforations longitudinally of said tape. The various perforations are also to be displaced transversely of the tape in accordance with the particular circuit closed so as to differentiate the subsequent indications.

These indications are, preferably, in the nature of visual indications such as may be afforded by an electric lamp, one lamp being provided in relation to each of the circuits. To effect such indications, the perforated tape advances to a photoelectric system which, when a perforation arrives thereat, will permit light from an exciter light source to activate the correlated photoelectric lamp aligned with the particular tape position of the said perforation. The photoelectric response will, in turn, through suitable relay means close a local circuit for the corresponding indication element such as an electric signal lamp. This lamp then remains energized until the service is completed and a restoring circuit is energized, for example, by the one effecting the service closing momentarily a suitable switch or push button or the like. The closing of said switch causes automatically advance of the tape one step, thereby interrupting the light beam; and, if a subsequent perforation is present, will cause a corresponding but different electric signal lamp to be energized in similar manner.

The nature of the invention, however, will best be understood when described in connection with the accompanying drawings, in which—

Figs. 1 to 4 inclusive are isometric projections illustrating various adaptions of the invention, Fig. 1 representing a bar of counter type of service fixture equipped with the novel indicator system, Fig. 2 a booth type, and Fig. 3 a counter not provided with seats; while Fig. 4 shows a form of indicating and control unit which may be applied to a bar or sales counter without appreciably marring or altering it.

Fig. 8 is a sectional view of a form of circuit-closing switch which may be used in an operating circuit and as is embodied in a stool.

Fig. 9 is a perspective view of a section of the control tape showing the arrangement of the control perforations therein.

Figure 5:
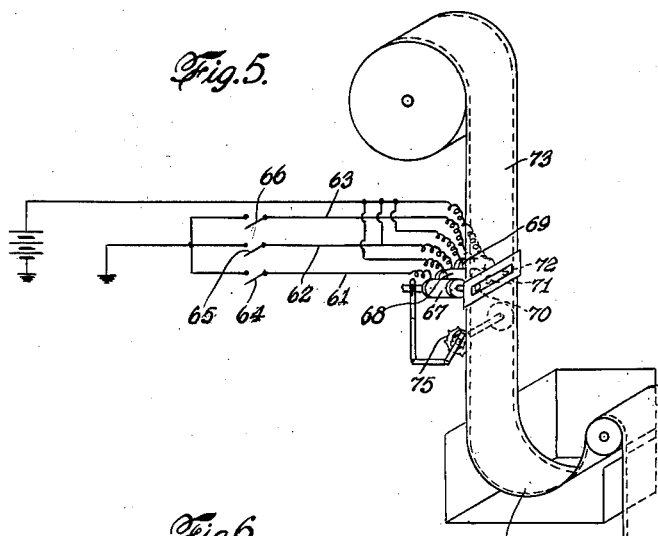
Fig. 5 is a diagrammatic representation of tape advancing mechanism and a tape utilized in carrying out the invention, together with the operating electrical circuits therefor.

Referring to Figure 1 of the drawings, 10 designates a counter or like installation as commonly employed in connection with the sale of various commodities; and, in the particular embodiment shown, the counter is provided with stools or seats located in front of the counter and of a nature more especially disclosed in Figure 8, said seats being represented in Figure 1 by their backs 11 which project above the top of the counter. At the rear of the counter is attached an angle bracket 12, its one face being arranged to lie, preferably, substantially flush with the counter top. In this face of the bracket are provided electric lamps 13 corresponding in number to the number of seats 11 and generally arranged directly opposite the respective seats. The lights, when energized (one at a time only), serve to indicate to a customer, as well as to the salesman, that among the various customers seated the one sitting opposite an energized lamp is the one immediately to be served.

When this service has been accomplished, the salesman presses a button 14 to actuate a switch device on the other face of the angle bracket, to not only deenergize the particular lamp corresponding to the serviced seat, but also to cause a different lamp to be energized automatically if further seats have been occupied. The sequence of such energization will be determined in accordance with the order of occupancy of the various seats—all of which will be hereinafter more fully set forth.

Figure 2 illustrates a modification in the arrangement of the signal lamps and switch devices which is particularly suitable for a "Booth" type of service, 20 indicating a booth comprising side separating walls 21, an end wall 22, a table 23 and seats 24. In the instant embodiment, a lamp signal 25 is provided in each booth, for example on the end wall 22 and it is included in a wall casing 26 with window 27. This casing provides, also, a call button or switch device 28, preferably located at the same (front) face as the lamp, as well as a restoring button or switch device 29 which is more or less concealed as in being located, for example, on a side wall of the casing 26. To secure service, it is thus necessary for the customer to press a button 28 which will predetermine the order of service; and when, in the proper sequence this particular booth is to receive service, the lamp 25 of the booth will become energized to indicate thus that the customer seated therein is next for service. The restoring button 29 is to be operated only by the one serving the booth and upon completion of service.

The entire control means may be associated also with a counter not provided with seating facilities, for example as indicated in Figure 3, the counter 30 in which call buttons 31 are arranged along the top of the counter at the front, with lamps 32 provided therein directly opposite the respective buttons. A series of concealed buttons 33 is located along the rear edge of the top of the counter 30, said top preferably overhanging slightly said counter at its rear.

In instances where it is undesirable to alter or possibly mar a counter, a unit panel may be provided, and such panel is designed to contain therein all of the signal elements and the switching means or control buttons. Thus, as indicated in Figure 4, the panel is constructed of a central portion 35 and along its opposite edges there are secured respectively a strip 36 and a strip 37, the former containing the call buttons 38, while in the latter strip 37 are contained the associated lamps 39 as well as the restoring buttons 40. The necessary wiring (not shown) among these various elements may conveniently be located over the underface of the panel where it will be concealed, and a cable 41 consisting of the different leads therefrom will extend to the sequence mechanism. A panel of this nature may thus be associated with an already installed counter merely by placing such panel on the top of the same, the weight of said panel being generally sufficient to maintain it in place thereon.

The closing of the various circuits by a call button or through occupancy of a seat must be only momentary. In the case of a seat this being affected by the weight of the occupant, the switch then must not again become closed upon the weight being removed, as when an occupant leaves a seat.

A switch suitable for this type of control is shown in Fig. 8 wherein the seat 45 telescopes with respect to its supporting base 46 against the action of a compression spring 47. A plunger 48 moveable with the seat carries a rod 49 guided on the switch plate or frame 50, which rod is adapted to engage a pivoted arm 51 carrying a contact-making roller 52 at its free end. This roller is designed to ride in a guideway 53 in the direction of movement of the rod 49, and in its passage through said guideway it momentarily rides over the protruding end of a contact pin 54 to actuate through its movement a snap switch (indicated by its case 55) to close a circuit represented by the leads 56. The roller mounting telescopes on the arm 51 to accommodate the vertical travel of the roller. The said roller, however, is not permitted to return through the guideway 53 which would result in a second contact in the same circuit. The return is through a further guideway 57 at one side of the guideway 53 and adapted for communication therewith at the lower and upper portions. A spring-pressed gate 58 is pivoted to swing in the guideway 53 but only in a direction to pass the roller in its downward travel; and, similarly, a spring-pressed gate 59 is provided at the upper outlet end of the guideway 57 opening only oppositely to the gate 58, namely, toward the guideway 53. When the weight is thus removed from seat 45, the roller 52 returns through the guideway 57 to its normal position, arm 51 being urged upwardly under the action of a spring 60.

Each of the button or seat circuit-closing mechanisms is included in a corresponding electrical circuit, Fig. 5, for example, in the circuits 61, 62 and 63 including the control switches 64, 65 and 66 respectively. These electrical circuits are designed to control respective solenoids 67, 68 and 69 included in such circuits and operating punches 70, 71, and 72 for providing an opaque tape 73 with perforations 73' tranversely thereof.

Figure 6:
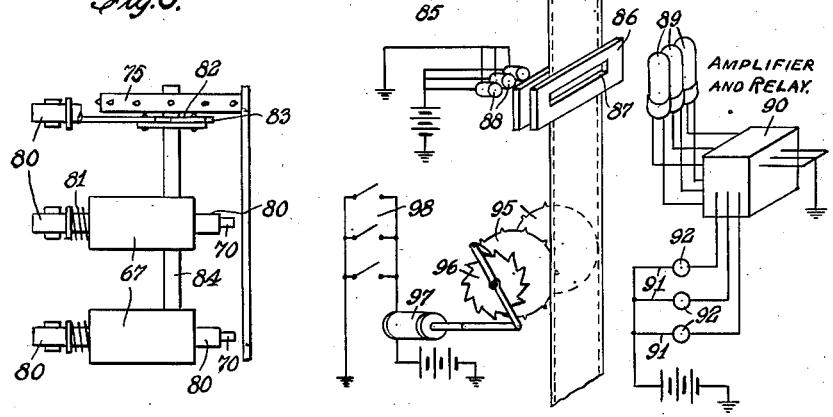
Figs. 6 and 7 are fragmentary detail views, respectively in plan and end elevation, of tape punching and tape advancing mechanism, with portion broken away in Fig. 6.
Figure 7:
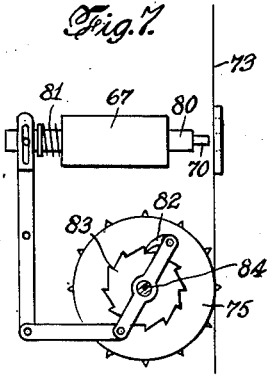

The tape 73 is shown more particularly in Fig. 9 of the drawings, and it is of the type having sprocket holes 74 along its respective edges whereby the tape may be advanced in well known manner through engagement of said sprocket holes by the teeth of corresponding wheels 75 each time a solenoid is energized, the advance being one step for each energization of a circuit. This intermittent advance of the tape 73 may conveniently be effected also by a punching solenoid upon the deenergization of such solenoid, through the return movement of the corresponding plunger thereof. Thus as indicated in Figs. 6 and 7 of the drawings, a plunger 80 is retracted under the influence of a spring 81 when the corresponding solenoid is deenergized; and the motion of this plunger is communicated to a pawl 82 engaging the teeth of a ratchet wheel 83 in manner well understood. Upon deenergization of the solenoids, the corresponding ratchet wheels are caused to rotate intermittently or step by step a shaft 84 upon which are mounted at its opposite ends the sprockets 75 for engaging the sprocket holes of the tape to be advanced.

The advancing tape is provided with a loop 85 and is suitably guided to a guide member 86 having registering slits 87 directed transversely across the tape passing through the guide member to register with the perforations 73' of said tape. These perforations continue longitudinally of the tape but are disposed transversely with respect to one another in accordance with the particular seat occupied.

The slitted guide member 86 is part of a photoelectric system including also the exciter lamps 88 and corresponding photoelectric lamps 89 with amplifier and relay indicated by the box 90. From this box 90 extend a plurality of circuits 91 corresponding to and controlled by the respective photoelectric lamps, and each circuit includes a suitable signal such as the electric lamps 92. From the foregoing, it will be apparent that a perforation registering with the slits 87 will permit light from a corresponding exciter lamp 88 to pass through a perforation 73' of the tape and activate the particular photoelectric lamps 89 corresponding to the selected circuit of circuits 61, 62 and 63 by which the perforation has been effected, thus indicating the customer to be next serviced.

There is provided, also, in connection with the tape movement a pair of take-up sprockets 95 which are to be advanced intermittently by pawl and ratchet mechanism 96 under the control of a solenoid 97, said take-up mechanism being located beyond the slitted guide member. Solenoid 97 is under control of one or, preferably, a plurality of switches or buttons 98 corresponding to the different seats, so that when a customer has been served the next one in sequence to be served, as well as the salesman, may be notified by energization of the particular lamp associated with the seat. This is accomplished merely by the closing of one of the buttons or switches 98, convenient to the salesman, to cause the tape to be advanced one step and thus bring into registry with the slit 87 the next one of the perforations 73'.

For the sake of clearness, the distance between the punching mechanism for the tape and the guide member through which it passes has been shown on a greatly exaggerated scale, also the length of the tape itself; and it will be understood that in practice the slit member will be located as closely as possible to the said punching mechanism.

We claim:

In a service system: means for indicating sequence of service, comprising a plurality of stations with customer-seating means, and an electrical circuit controlling means associated respectively with each station and independently operable, together with an indicator means visible to the occupant of the corresponding seating means and to an attendant for servicing said station; electrically-operated selector means, and independent electrical circuits between the respective circuit controlling means and selector means to advance the latter successively upon the closing of any of said circuit controlling means; means automatically controlled by the selector means to affect the indicator means of a corresponding station; and additional circuit controlling means at each indicator means and manually operable by an attendant, together with independent electrical circuits respectively between the said additional circuit controlling means and the selector means to restore to normal upon said manual operation a corresponding indicator means previously affected by the closing of its first-named circuit controlling means.

PETER A. BUCKY.
PAUL SARASON.

REFERENCES CITED

The following references are of record in the file of this patent:

UNITED STATES PATENTS

| Number | Name | Date |
|---|---|---|
| 1,072,152 | Ocampo | Sept. 2, 1913 |
| 1,155,106 | Schweitzer | Sept. 28, 1915 |
| 1,821,264 | King | Sept. 1, 1931 |
| 2,124,906 | Bryce | July 26, 1938 |
| 2,206,550 | Mordin | July 2, 1940 |
| 2,371,491 | Wright | Mar. 13, 1945 |
| 2,391,246 | Kenney | Dec. 18, 1945 |
| 2,407,411 | Folis | Sept. 10, 1946 |